United States Patent [19]

Riel

[11] Patent Number: 4,780,159

[45] Date of Patent: Oct. 25, 1988

[54] METHOD OF LAMINATING MULTI-LAYER NOISE SUPPRESSION STRUCTURES

[75] Inventor: Frank J. Riel, San Diego, Calif.

[73] Assignee: Rohr Industries, Inc., Chula Vista, Calif.

[21] Appl. No.: 2,566

[22] Filed: Jan. 12, 1987

[51] Int. Cl.⁴ .................. B32B 31/04; B32B 31/12; B32B 31/20

[52] U.S. Cl. ................. 156/87; 156/212; 156/247; 156/253; 156/285; 156/286; 156/293; 156/303.1; 156/309.6; 156/344; 181/291; 181/292; 264/511

[58] Field of Search ............. 156/87, 212, 219, 247, 156/249, 250, 252–253, 293–294, 285–286, 309.6, 303.1, 300, 344, 234; 264/511, 241, 248; 181/292, 293, 290, 291, 284, 286; 428/131, 138

[56] References Cited

U.S. PATENT DOCUMENTS

| | | | |
|---|---|---|---|
| 1,825,770 | 10/1931 | Barnett | 181/293 |
| 3,154,453 | 10/1964 | Demke | 156/285 |
| 3,177,273 | 4/1965 | Fingerhut | 264/511 |
| 3,330,712 | 7/1967 | Rowe | 156/247 |
| 3,493,451 | 2/1970 | Beery | 156/286 |
| 3,633,269 | 1/1972 | Bachmeier | 156/247 |
| 3,952,831 | 4/1976 | Bernard | 181/292 |
| 4,189,027 | 2/1980 | Dean | 181/293 |
| 4,314,814 | 2/1982 | Deroode | 156/286 |
| 4,504,346 | 3/1985 | Newsam | 181/292 |

Primary Examiner—Merrell C. Cashion, Jr.
Attorney, Agent, or Firm—Patrick J. Schlesinger; Frank D. Gilliam

[57] ABSTRACT

A method of laminating a porous overlay material to a perforated plate with a dry film adhesive which does not block perforations or pores in the two components. A lay-up is preferably prepared by assembling in order on a vacuum platen a porous peel ply sheet, a sheet of dry film adhesive, a perforated plate, a sheet of microporous material to be bonded to the perforated plate and an air permeable sheet. A vacuum is drawn through holes in the vacuum platen contiguous to the bottom surface of the porous peel ply sheet while the assembly is heated to the softening temperature of the adhesive film. The vacuum is directly applied through the perforation, drawing the film down through the perforations and into contact with the peel ply sheet. As heating continues the film softens sufficiently to adhesively bond the microporous material to the perforated sheet. When the pack is disassembled, the adhesive extending beyond the holes and into the peel sheet is stripped away with the peel sheet, leaving all of the holes and pores open and the holes coated with the adhesive. The resulting structure is particularly adapted for use in noise suppression structure used in aircraft gas turbines engine housings.

9 Claims, 1 Drawing Sheet

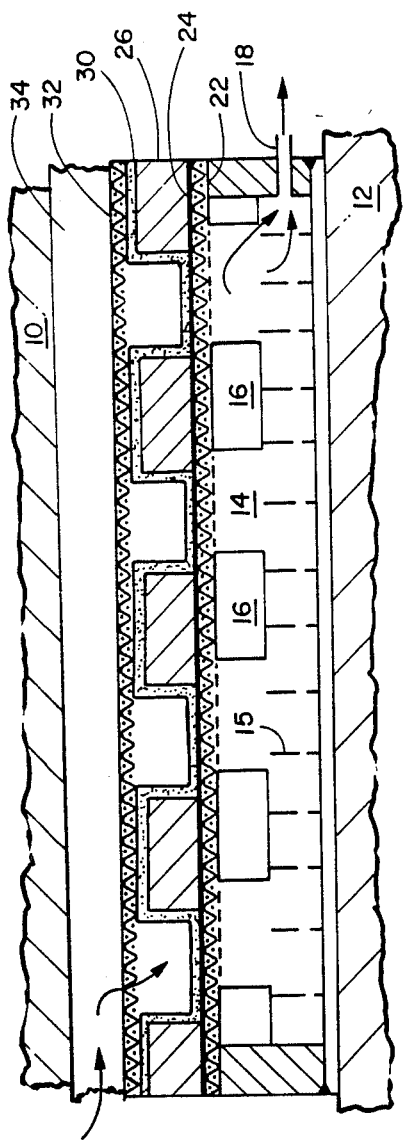
FIGURE 1
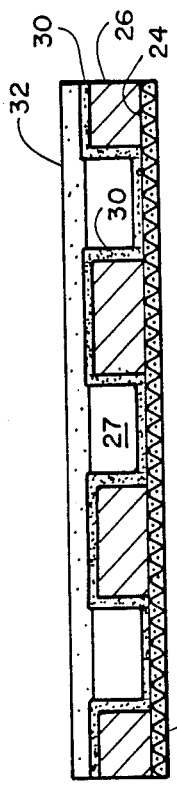
FIGURE 2
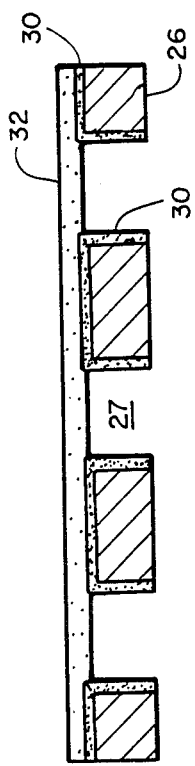
FIGURE 3
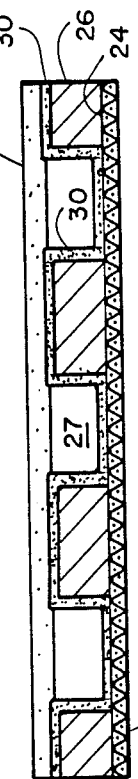
FIGURE 4
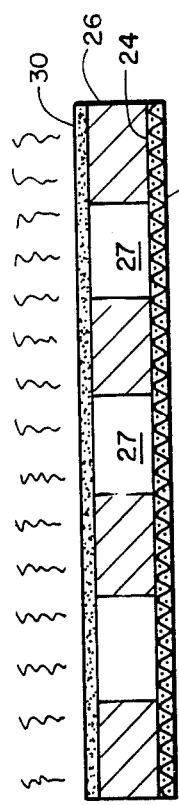
FIGURE 5
FIGURE 6

METHOD OF LAMINATING MULTI-LAYER NOISE SUPPRESSION STRUCTURES

BACKGROUND OF THE INVENTION

This invention relates, in general, to an improvement in noise suppression structures and more specifically, but not by way of limitation, to a method of adhesively bonding a perforated sheet to a microporous sheet for such structures.

Structures having a perforated plate with a microporous material bonded to one side have been found to have great utility in noise suppression structures used in gas turbine aircraft engine housings or the like. Difficulties have been encountered in bonding the two porous members together in a manner that is suitable for volume production and which does not unacceptably reduce porosity by covering at least some perforations or pores.

Spraying the perforated plate with a liquid adhesive, then pressing a microporous material thereagainst has not been entirely effective because of wicking of the liquid adhesive into the microporous material and closing some pores in edges which overlap the perforations. Also, handling the wet, tacky, sprayed plate and trying to spread the porous material thereover without wrinkling thereof is very difficult, especially in volume production circumstances. This technique seems to be effective only where two perforated plates are to be bonded together, as described, for example by Elder et al. in U.S. Pat. No. 3,770,560. Even there, the use of wet adhesives is cumbersome and slow.

Attempts have been made to impregnate the porous material with sufficient adhesive to permit effective bonding to another surface, but not so much as to close pores, as described by Hilliard et al. in U.S. Pat. No. 4,111,081. Consistent critical impregnation is difficult, with insufficient resin resulting in poor bonding and excess resin severely reducing porosity. Some pores will always be closed and/or reduced in size.

Dry adhesive layers of the sort described by Martin et al. in U.S. Pat. No. 2,951,004, which can be laid up between sheets to be laminated, and then heated to melt and become adhesive are now well known. While very effective in volume lamination of imperforate sheets, they have not been useful for bonding perforate or porous sheets, since the adhesive covers the perforations or pores. As described by Kazama in U.S. Pat. No. 4,150,186, the hot melt adhesive film can even be caused to deliberately fill holes by using a vacuum to draw part of the film into a hole to fill it and form a locking button.

Thus, there remains a need for an improved method of bonding a perforated sheet to microporous materials in a manner that is suitable for volume production and which does not block any perforations or pores.

SUMMARY OF THE INVENTION

Basically, my lamination method initially comprises the steps of laying-up the following components on a vacuum platen: (a) a porous peel ply sheet, (b) a perforated plate, (c) a sheet of dry film adhesive, (d) a sheet of microporous material and a gas premeable sheet where the upper pack surface is covered, such as by a press platen. A peripheral gasket is preferably laid on the vacuum platen around the porous breather peel ply sheet and in contact with the edge region of the perforated plate to prevent edgewise air movement into the breather sheet. The dry adhesive film is brought into intimate contact with both the microporous sheet and the perforated plate, a vacuum is drawn through the breather sheet by the vacuum platen and the stack is heated. As the adhesive film melts, the vacuum draws any area of adhesive over a perforation down into the perforation, against the side walls of the perforation, and against and into the underlying gas porous peel ply sheet. As heating continues, the adhesive becomes tacky and bonds the microporous sheet to the imperforate area of the perforated plate and finally (if a thermosetting resin) cures to a flexible, non-tacky condition. The pack is the disassembled with the film extending from the bottom of each hole into the breather peel sheet being stripped away with the peel ply sheet. The resulting structure of well bonded porous sheet and perforated plate retains full porosity and is particularly suitable for sound attenuation structure intended for aircraft engine housing applications.

BRIEF DESCRIPTION OF THE DRAWING

Details of a preferred embodiment of my invention are shown in the drawing, wherein:

FIG. 1 is an elevation partially cut-away, of my laid-up laminating pack in a press;

FIG. 2 is a detail of the adhesive sheet, the perforated sheet and the porous peel sheet at an intermediate point in my novel process;

FIG. 3 is a detail section view of the lay-up of FIG. 2 illustrating the solvating step of my process; and FIG. 4 is a detail section of the layup of FIG. 2 after application of heat and vacuum;

FIG. 5 is a detail of the lay up of FIG. 4 after the microporous sheet has been laid onto the adhesive film and prior to insertion of the lay up into a hot press;

FIG. 6 is a detail of the lay up of FIG. 5 illustrating the adhesively bonded lay up after it has been cured in the press and the peel sheet has been removed.

DETAILED DESCRIPTION OF THE INVENTION

Referring now to FIGS. 1 and 2, there is seen a pair of upper and lower press faces 10 and 12, respectively, the lower of which supports a vacuum platen or box 14. Vacuum box 14 includes a tube 18 which communicates with a honeycomb core 15 and a perforated heat transfer upper surface 16. Tube 18 can be connected to a conventional vacuum source (not shown) to draw a vacuum within platen 14.

A breather sheet 22, typically a wire fabric sheet through which air can be easily drawn by a vacuum, is laid on the surface 16 of vacuum platen 14. Any suitable gas pervious fabric breather sheet may be used.

A perforated plate 26 to be laminated is then placed on peel ply sheet 22. This plate may have any suitable thickness and number and size of perforations, which will be selected in accordance with the intended use of the final structure. Typically, perforated plate 26 for the purpose intended will have a thickness of about 0.025 inch, and have a plurality of about 0.050 inch diameter holes 27 spaced across its surface.

In order to reduce air leaking in from around the pack edges and obtain maximum vacuum effectiveness, it is preferred that a peripheral gasket (not shown) be installed around peel ply sheet 22 in a sealing relationship to vacuum platen 14 and perforated plate 26. The gasket either contacts an imperforate edge region of plate 26 or has sufficient width to bridge any perforations in the edge region.

A sheet of conventional dry adhesive film 30 is then placed over perforated plate 26. Any conventional thermosetting or thermoplastic film may be used. If a thermoplastic resin is used, the film will be heated to melt, then cooled before removal or the structure as detailed below. In a thermosetting resin, the film will be heated to melt the resin, then heating will be continued to cure the resin. For aircraft engine applications, thermosetting resins are often preferred due to their high temperature resistance in the cured state. In any event, the film 30 is softened by heating or solvating. A vacuum is then drawn on the vacuum platen 14 to pull the film 30 down into the holes of the perforated plate 26 and into contact with the sheet 22, per FIG. 4.

A sheet of porous or microporous material 32 is then positioned over the adhesive film 30 as per FIG. 5. Any conventional microporous sheet may be used. This is ordinarily a finely woven wire material which will rely for structural strength in the final laminate on perforated plate 26.

Pressure is then applied by platen 10, or any other suitable means such as an pervious inflated bag 34 or the like, to bring adhesive film 30 into uniform intimate contact with both perforated plate 26 and porous peel ply sheet 32.

After the lamination pack has been laid-up as seen in FIGS. 1 and 2, the pack is heated to adhesively bond the film 30 to the walls of hole 27 and to wire cloth peel ply sheet 22 at the bottom of holes 27. The smoothly flowed film 30, as seen in FIG. 4, acts as a coating or paint on the interior walls of holes 27 and adheres lockingly to the wire cloth peel ply sheet 24 so as to have any portion of film 30 that locks into sheet 22 removed on completion of lamination.

After the thermosetting resin film 30 has been cured the pack is disassembled by opening the press, removing the lower breather sheets and stripping away any portion of adhesive film 30 that extends beyond the bottom of holes 27. This leaves the laminated structure seen in FIG. 6, having a microporous sheet 32 well bonded to a perforated plate 26 by an adhesive layer 30 that extends down the walls of holes 27 but which does not in any way restrict the porosity of microporous sheet 32 through holes 27 of the perforated plate 26.

While certain specific arrangements and materials have been described in detail in the above description of a preferred embodiment, these can be varied by those skilled in the art without departing from the spirit of this invention. It is my intention therefore to be limited only by the scope of the following claims.

I claim:

1. A method of adhesively bonding porous materials together for use in noise suppression structures which comprises the steps of:
   providing a vacuum platen;
   laying a sheet of gas permeable material thereon;
   placing a perforated plate thereover;
   laying a sheet of dry adhesive film thereover;
   softening said adhesive film to at least its softening temperature;
   drawing a vacuum through said vacuum platen whereby the softened adhesive film over perforations in said perforated plate is drawn into the perforations and against the sidewalls of the perforations and against and into the underlying gas permeable sheet;
   stacking a sheet of microporous material on top of the adhesive film;
   applying sufficient pressure to the lay-up to assure intimate contact between said adhesive film and both said microporous sheet and the imperforate area of said perforated plate during said heating and vacuum application steps, so that the film bonds the perforated plate and microporous sheet together; and
   stripping the resulting laminated perforated plate and microporous sheet structure from the gas permeable sheet with the adhesive extending through the perforations and into the gas permeable sheet remaining with the gas permeable sheet so as to leave the perforated sheet free from the adhesive film on the side opposing the microporous sheet.

2. The method according to claim 1 wherein said gas permeable sheet comprises a gas permeable wire cloth breather sheet laid on said vacuum plate.

3. The method according to claim 2 further including the step of positioning a porous member on top of said microporous sheet prior to the application of pressure to the laid-up assembly.

4. The method according to claim 3 wherein said pressure is applied by bringing a press platen into uniform pressure contact with the upper surface of said porous member.

5. The method according to claim 1 wherein said adhesive film is a thermosetting resin and further including continuing said heating until said resin is cured prior to removing the wire cloth breather sheet.

6. The method according to claim 1 wherein said adhesive is a thermoplastic resin and including the further step of cooling said assembly below the softening temperature of said resin prior to removing the laminated structure.

7. A method of making a laminated porous noise suppression structure which comprises the steps of:
   providing a vacuum platen;
   stacking thereon in order;
   a permeable peel ply sheet;
   a perforated plate having one side in contact with said peel ply sheet;
   a sheet of dry adhesive film;
   a sheet of microporous material; and
   a permeable breather member;
   applying sufficient pressure on the top of the resulting lay-up to assure intimate contact between said film and both said microporous sheet and said perforated plate;
   heating said adhesive film to at least its softening temperature;
   drawing a vacuum on the assembly through said vacuum platen and said breather sheet whereby said adhesive sheet is drawn into and against the sidewalls of the perforations of said perforated plate and into contact with and into said peel ply sheet and said microporous sheet is bonded to the imperforate area of said perforated sheet;
   removing the laminated assembly of perforated plate and microporous sheet from the lay-up; and
   stripping said peel ply sheet away, whereby adhesive film areas extending into the peel ply sheet remain in said peel ply sheet.

8. The method according to claim 7 wherein said pressure is applied by bringing a press platen into uniform pressure contact with the upper surface of a permeable breather sheet positioned on the microporous sheet.

9. The method according to claim 8 wherein said adhesive film is a thermosetting resin and further including continuing said heating until said resin is cured prior to removing the laminated structure from the press.

* * * * *